US012718419B2

(12) United States Patent
Madams

(10) Patent No.: US 12,718,419 B2
(45) Date of Patent: Aug. 25, 2026

(54) OPTIMIZED COMPRESSION MODE SELECTION FOR BC7 TEXTURE ENCODING

(71) Applicant: Sony Interactive Entertainment LLC, San Mateo, CA (US)

(72) Inventor: Thomas Madams, Seattle, WA (US)

(73) Assignee: Sony Interactive Entertainment LLC

( * ) Notice: Subject to any disclaimer, the term of this patent is extended or adjusted under 35 U.S.C. 154(b) by 253 days.

(21) Appl. No.: 18/348,674

(22) Filed: Jul. 7, 2023

(65) Prior Publication Data

US 2025/0014231 A1 Jan. 9, 2025

(51) Int. Cl.
*G06T 9/00* (2006.01)

(52) U.S. Cl.
CPC .................................... *G06T 9/002* (2013.01)

(58) Field of Classification Search
CPC ......... G06T 9/00; G06T 11/001; G06T 9/002; H04N 19/176; H04N 19/66
See application file for complete search history.

(56) References Cited

U.S. PATENT DOCUMENTS

| | | | | |
|---|---|---|---|---|
| 2012/0281028 | A1* | 11/2012 | Orlick | G09G 3/3426 345/102 |
| 2019/0335183 | A1* | 10/2019 | Patel | H04N 19/59 |
| 2021/0312592 | A1* | 10/2021 | Liu | G06V 10/82 |
| 2022/0092740 | A1 | 3/2022 | Hobson | |
| 2022/0138989 | A1 | 5/2022 | Fuller | |
| 2022/0383633 | A1* | 12/2022 | Zhang | G06V 20/70 |
| 2023/0096567 | A1 | 3/2023 | Nalci et al. | |

OTHER PUBLICATIONS

"International Search Report and Written Opinion", dated Nov. 14, 2024, from the counterpart PCT application PCT/US24/33688.

* cited by examiner

*Primary Examiner* — Ming Wu
(74) *Attorney, Agent, or Firm* — Kilpatrick Townsend & Stockton LLP

(57) ABSTRACT

Techniques are described for training a machine learning (ML) model is learn compression errors for various compression modes of BC7 given an input set of features that depend on per-channel pixel value ranges in a BC7 block.

17 Claims, 15 Drawing Sheets a b c d
e f g h
i j k l
m n o p

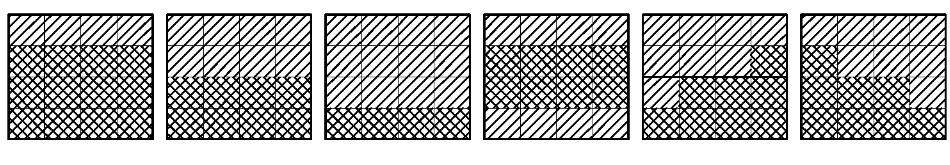
FIG. 9
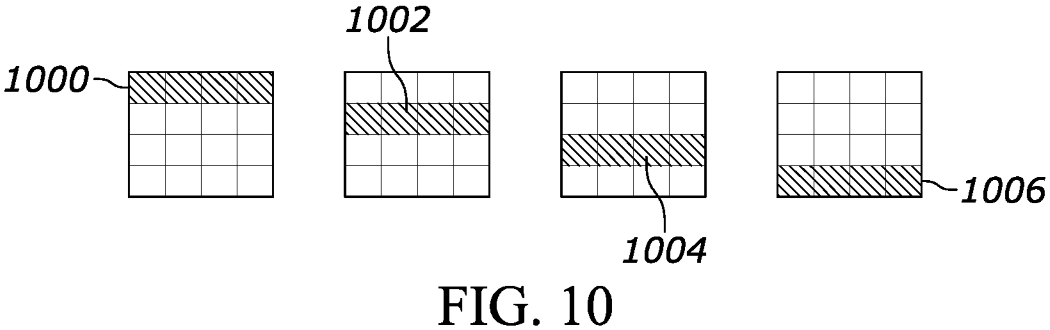
FIG. 10
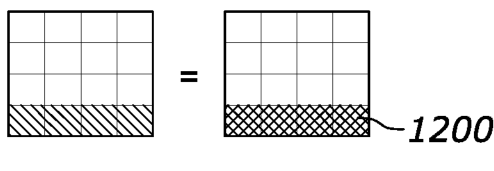
FIG. 11
=
1200
FIG. 12
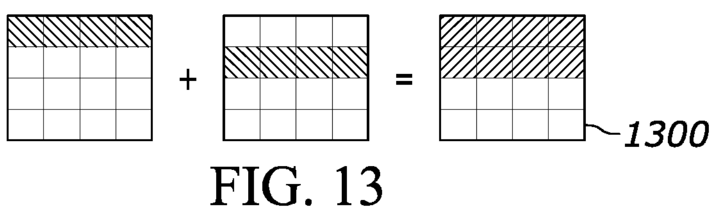
FIG. 13

+
=
1500

+
=
1600

+
=
1700

+
=
1800

OPTIMIZED COMPRESSION MODE SELECTION FOR BC7 TEXTURE ENCODING

FIELD

The present application relates to technically inventive, non-routine solutions that are necessarily rooted in computer technology and that produce concrete technical improvements, and more specifically to optimized compression mode selection for BC7 texture encoding.

BACKGROUND

In computer simulations such as computer gaming, objects are rendered in part using "texture" data that describes the surfaces of the objects. The more texture data for a given object, the higher resolution the rendering can be. However, for bandwidth purposes it is desirable not to send large texture data structures to a rendering device.

SUMMARY

As understood herein, to conserve memory, texture data is usually compressed into one of a variety of block compression (BCn) modes that are natively sample-able on GPUs. BC6 and BC7 are of particular relevance to present principles.

Accordingly, an apparatus includes at least one processor assembly configured to calculate plural features based on per-channel ranges of pixels in at least a first block of texture data, and based at least in part on the features, identify a block compression (BC) mode of compression. The processor assembly is configured to compress the first block using the BC mode of compression.

In some examples the BC mode of compression includes a BC7 mode.

In example implementations the processor assembly may be configured to input, to a machine learning (ML) model, the features and receive from the ML model identification of the BC mode of compression.

If desired, at least one of the features can be based at least in part on a channel range that is the difference between maximum and minimum pixel values for a channel in a block or subset of a block. A maximum one of three RGB channel ranges in a block or subset of a block establishes at least one feature.

In addition or alternatively, at least one of the features can be based at least in part on a sum of RGB channel ranges in a block or subset of a block.

In addition or alternatively, at least one of the features can be based at least in part on a range of alpha values in a block or subset of a block.

In another aspect, a device includes at least one computer storage that is not a transitory signal and that in turn includes instructions executable by at least one processor assembly to select a block compression 7 (BC7) mode of compression for texture data. This may be accomplished at least in part by, for each block in a training set of blocks of pixels, computing an error resulting in compressing the block in each of plural BC7 modes, as well as for each block in the training set, computing at least one feature associated with a per-channel range of pixel values within the block. The features and errors are used by at least one machine learning (ML) model to train the model to predict per-mode compression error based on the features, with the model subsequently being used to select a BC7 mode of compression for the texture data.

In another aspect, a method for processing texture blocks includes computing a channel range that is the difference between maximum and minimum pixel values for a channel in a block or subset of a block. A maximum one of three RGB channel ranges in a block or subset of a block establishes a first feature. The method includes computing a sum of RGB channel ranges in the block or subset of the block to establish a second feature, and computing a range of alpha values in the block or subset of the block to establish a third feature. The first, second, and third features are used to identify a block compression mode of compression for the block.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 9-21 graphically illustrate principles of the logic of FIG. 8;

DETAILED DESCRIPTION

Figure 1:
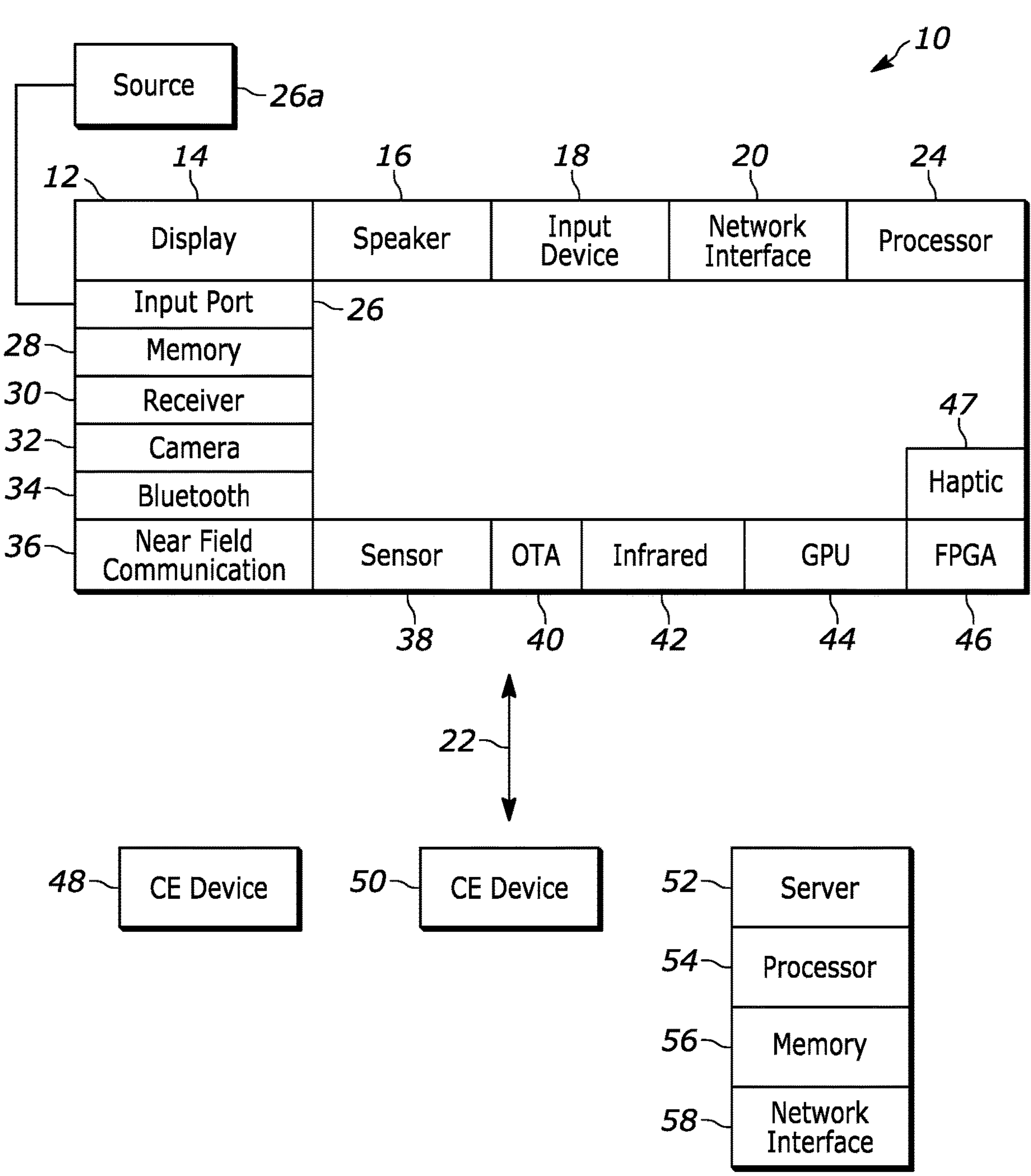
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
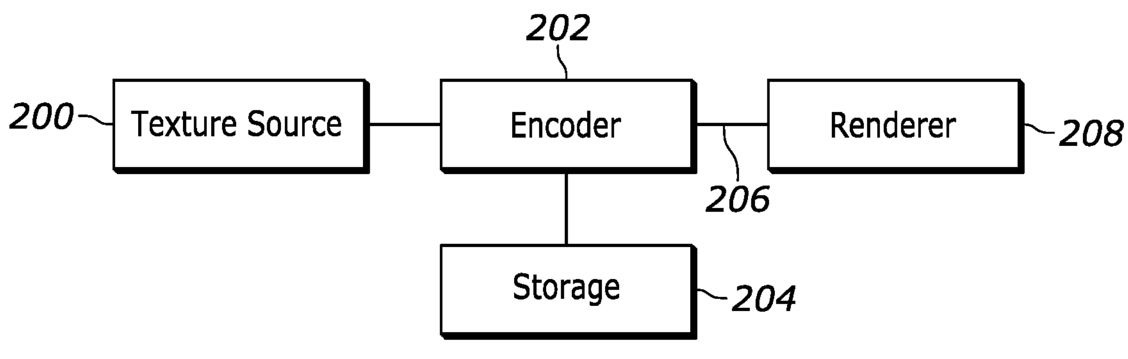
FIG. 2 illustrates an example block compression (BC) system.

Prior to turning to FIG. 2, "textures" are data structures that can be mapped onto images to characterize the surfaces of the rendered objects. The basic data element of a texture data structure is a texture element or texel (combination of texture and pixel). Textures are represented by arrays of texels representing the texture space. The texels are mapped to pixels in an image to be rendered to define the rendered surface of the image.

Various types of compression may be used on textures. One type is block compression, sometimes expressed as BCn compression that is a lossy texture compression which can be decompressed in-place by graphics processing units (GPUs). Block compression does not require the whole image to be decompressed, so the GPU can decompress the data structure while sampling the texture as though it was not compressed at all.

Block compression techniques compress 4×4 blocks of pixels into a single (smaller) data packet. Generally, this involves selecting two or more (depending on the BC compression type) "endpoint" colors with some information per-pixel about how to blend between those two colors at each pixel. The endpoint colors are shared for the entire 4×4 pixel block. For instance, for an image of only red, blue, and purple pixels, the compressor would likely choose one end point to be red, and the other blue. The purple pixels would have values that blend the two together.

The different BC types mostly differ in how many texture channels they have (BC4 for instance is one channel grayscale, "black and white"). BC6 and BC7 are special because they introduce the concept of modes that decide the interpretation of each block. With BC6/7 different modes allocate their bits differently on a per-block basis which allows the encoder/compressor to make different quality trade-offs in different regions of a texture.

With specific regard to BC7 and consistent with the above, textures are subdivided into fixed size 4×4 blocks, and each block is compressed to a fixed number of bits (e.g., BC7 uses 128 bits per block). Ignoring partitions for now, pixels in a block are represented by a single pair of endpoint colors, shared between all pixels in the block and a 16 per-pixel interpolation index values, which define how much to blend between the two endpoint colors. A pixel's color in the compressed block is calculated by blending between the two endpoint colors by the amount specified by the pixel's interpolation index.

A single pair of endpoint colors can compress a block with low error if all pixels in a block are well-approximated by a blend of those two colors. On the other hand, if a block contains more than two very different colors, it is impossible to define two endpoint colors for which this approximation holds. Accordingly, to address this problem, several modes in BC7 partition a 4×4 block into two or three subsets, and each subset has its own pair of endpoint colors. Multi-subset modes necessarily have lower precision endpoints and interpolation indices because they must fit extra endpoint colors in the same 128 bits as block modes that do not use partitions. A block's partition must be one of sixty four (64) predetermined patterns that are fixed and defined in the BC7 specification. Selecting the "best" partition of the sixty four currently requires an essentially exhaustive test/search process. Techniques described herein provide an efficient way to select an effective partition.

Additionally and apart from the issue above of selecting a best partition, BC7 supports eight different compression modes, each of which makes its own respective trade-off between endpoint color precision and interpolation index precision (among other things). The mode used to encode each block is signaled in the first few bits of the encoded data. Generally, modes with higher precision endpoint colors have lower precision interpolation indices, and vice-versa. Depending on the mode used to compress a block, interpolation indices will be either 2-bit, 3-bit or 4-bit per pixel. Current techniques for selecting the best compression mode for BC7 textures is to conduct an exhaustive search, in which every mode is tested and the one selected that minimizes compression error. Techniques herein describe an efficient way to select a compression mode for a BC7 texture.

Accordingly, turn now to FIG. 2, which illustrates a texture source 200 that sends textures to an encoder 202 such as a BC6 or BC7 encoder. While discussion below uses BC7 as an example, present principles apply to other compression modes such as BC6.

The encoder 202, which in a hardware implementation includes a processor assembly configured according to principles herein, processes the textures according to principles herein and stores compresses textures in one or more storages 204 and/or sends the compressed textures via a communication path 206 such as a local data bus or wired/wireless network link to a texture renderer 208, which typically includes one or more processors such as GPUs with memories to render images in accordance with image data and texture data on a display.

Note that to maximize efficiency of a hardware implementation of the encoder, data should be entirely 8 bit or 16 bit data.

Figure 3:
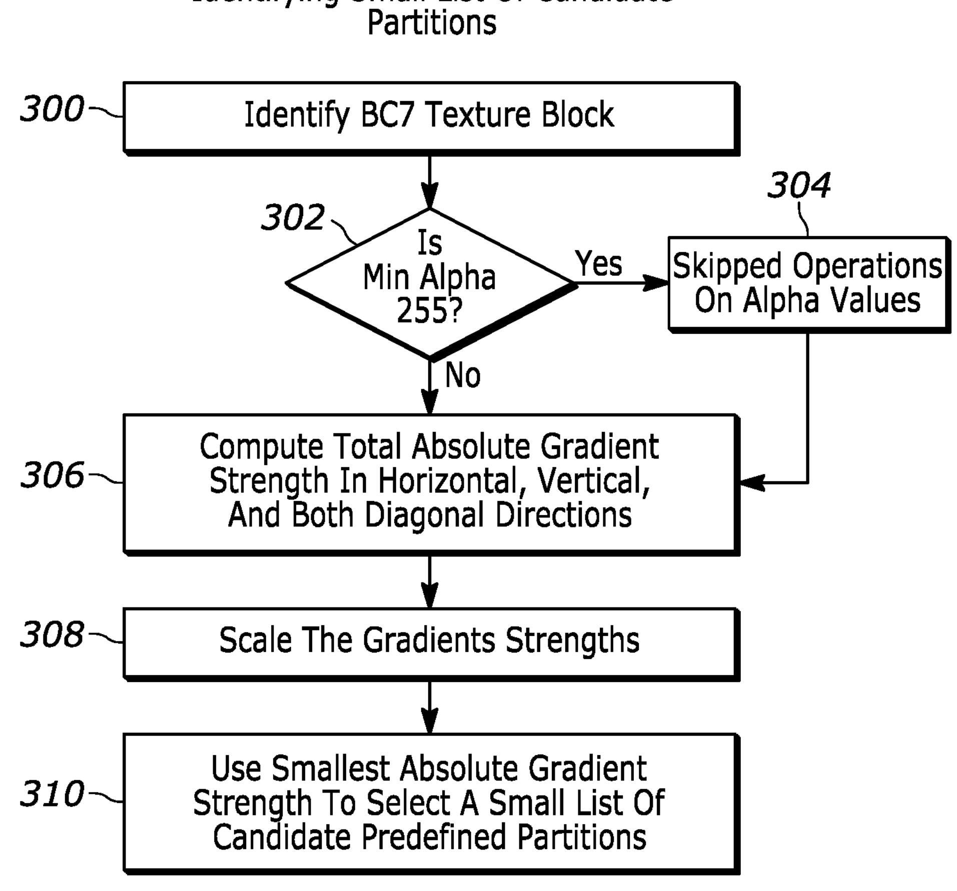
FIG. 3 illustrates example logic in example flow chart format for selecting a small group of candidate partitions from the sixty four (64) possible partitions for the cases shown in FIGS. 3A and 3B.

Refer now to FIG. 3. In example embodiments the logic may start at state 300 by a shortcut or sorts in which for each BC7 texture block to be compressed, it may be identified at decision diamond 302 whether the block is fully opaque (i.e., the alpha value for all 16 pixels in the block is 255). If so, all operations discussed below may be skipped for alpha values in this block as indicated at state 304.

The block is then processed at state 306 by computing, for each channel of each pixel, the total absolute gradient strength in four directions, namely, horizontal, vertical, and two diagonal dimensions of the block. While ensuing graphical figures illustrate this, some further text description is in order here.

An RGBA pixel has four channels, in this example, a red channel, a green channel, a blue channel, and an alpha channel (which may be skipped as indicated above for opaque blocks). To compute a total gradient strength, for each pixel and each channel, the numerical value of that pixel for that channel is subtracted from the numerical value of an immediately adjacent pixel for that channel, and the absolute value of the remainder represents the gradient strength. Thus, for each pair of immediately adjacent pixels, four absolute gradient strengths are computed and summed to render the total absolute gradient strength for that pair. This is done for each direction, and then the total absolute gradient strengths for each pair of pixels in each given direction are summed to produce a total absolute gradient strength of the block in each of the four directions.

When done in the horizontal direction, the pixels being compared are immediately adjacent to each other in the same row of the texture block with no intervening pixels in that row between the pixels being compared. When done in the vertical direction, the pixels being compared are in the same column of the texture block with no intervening pixels in that column between the pixels being compared. When done in one of the diagonal configurations, the pixels being compared are in the same diagonal of the texture block with no intervening pixels in that diagonal between the pixels being compared. The two diagonals are offset 45 degrees from the vertical and horizontal directions, with one diagonal proceeding right and down relative to the block (termed "backward" herein) and the other diagonal proceeding right and up relative to the block (termed "forward" herein).

The logic moves from state 306 to state 308 to scale the four total absolute gradients strengths of the block under test. This is because a 4 pixel-by-4 pixel block has twelve pairs of immediately pixels in each of the vertical and horizontal directions but only nine pairs of immediately pixels in each of the diagonal directions. Accordingly, the scaling at state 308 can be implemented in some embodiments by multiplying the vertical and horizontal strengths by nine and the diagonal strengths by twelve.

Moving to state 310, the smallest absolute gradient strength after scaling is selected from among the four, i.e., from among the horizontal, vertical, and two diagonal gradient strengths. This smallest absolute gradient strength is used to select a small predefined list of candidate partitions from among the 64 partitions illustrated in FIGS. 3A and 3B. The predefined small lists may be generated by a human expert or by a machine learning (ML) model to select plural of the 64 possible partitions to correspond to each of the four directions by noting, for example, that some of the 64 possible partitions exhibit better compression qualities with smaller losses than others for a given direction.

Figures 4, 5:
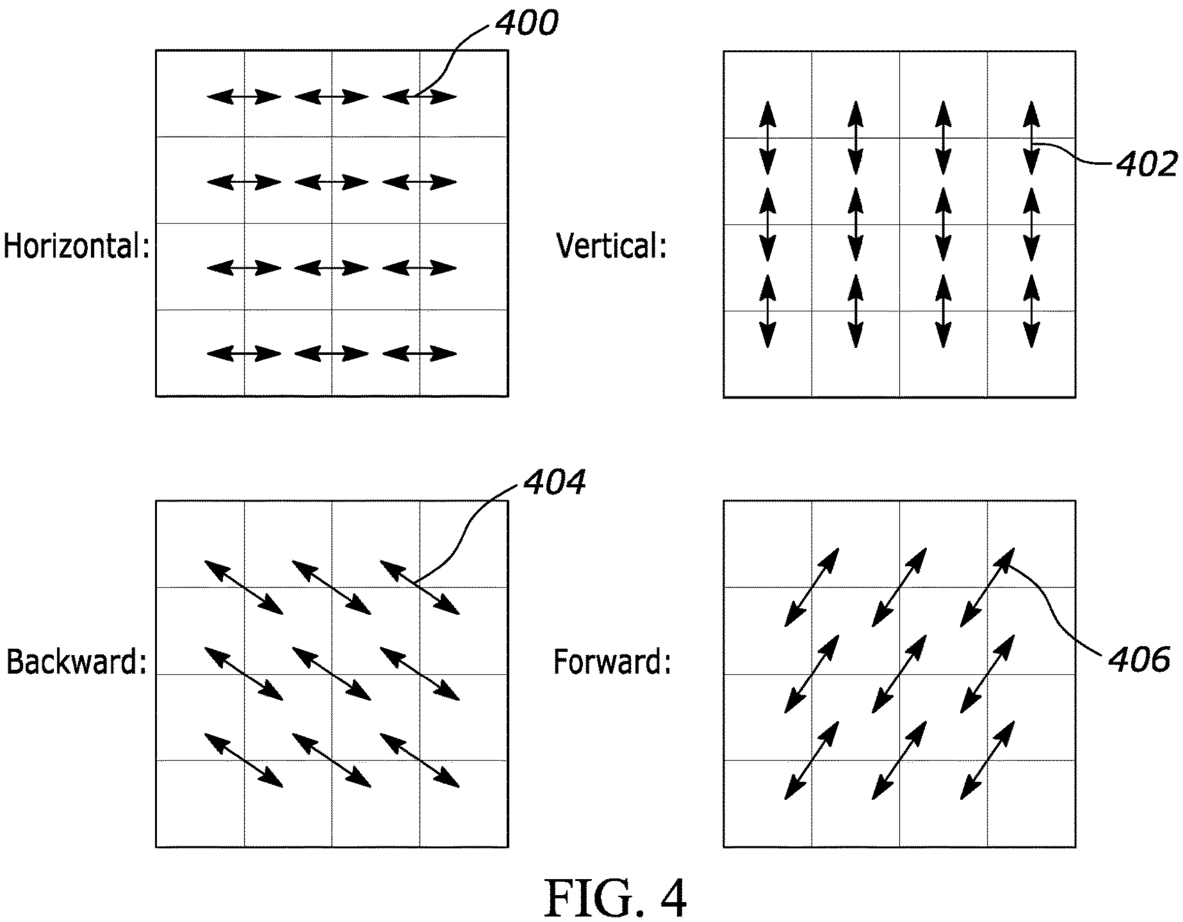
FIGS. 4-6 graphically illustrate computation of gradient strengths in four directions consistent with the logic of FIG. 3.
Figure 6:
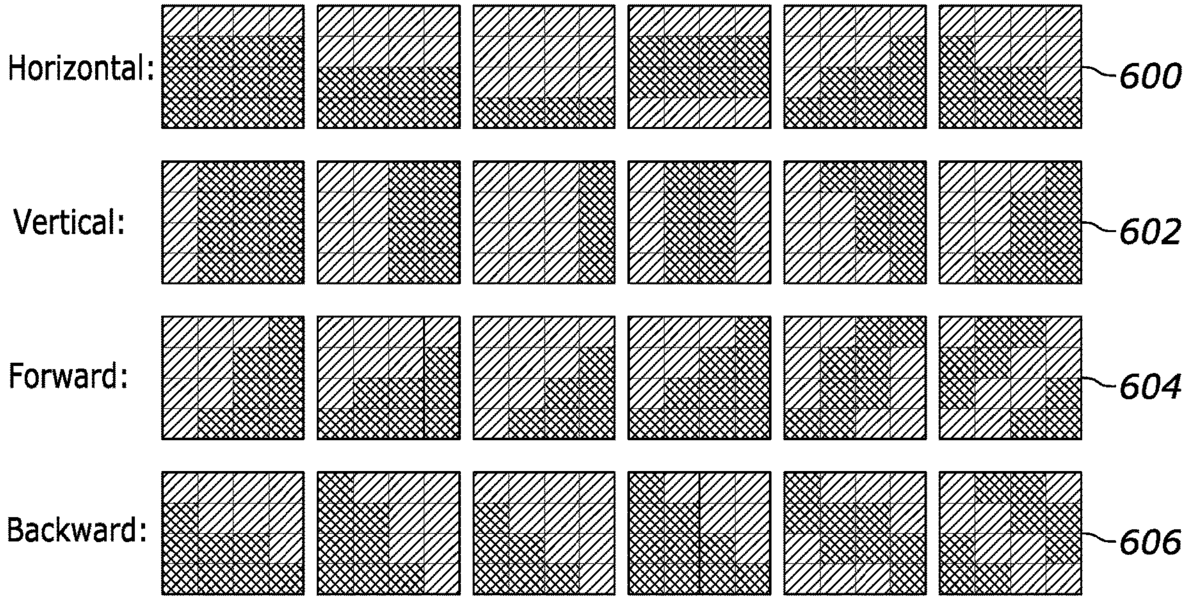

Turn now to FIGS. 4-6 for graphical illustration of the discussion above. FIG. 4 illustrates computation of the total absolute gradient strength of a block in horizontal 400, vertical 402, and both 45° diagonal 404, 406 directions. As indicated above, gradient strength is computed by accumulating the absolute differences between each pair of immediately adjacent pixels indicated by the arrows, for each pixel channel.

FIG. 5 illustrates details for computing the horizontal gradient strength, it being understood that computations other directions are similar. Given the pixel labeling in FIG. 5, the horizontal direction strength is computed with the following, where ach means the numerical value in the denoted channel in pixel a:

$$\text{strength} = 0$$

$$\text{for } ch \text{ in } \{R, G, B, A\}:$$

$$\text{strength} \mathrel{+}= \text{abs}(ach-bch) + \text{abs}(bch-cch) + \text{abs}(cch-dch)$$

$$\text{strength} \mathrel{+}= \text{abs}(ech-fch) + \text{abs}(fch-gch) + \text{abs}(gch-hch)$$

$$\text{strength} \mathrel{+}= \text{abs}(ich-jch) + \text{abs}(jch-kch) + \text{abs}(kch-lch)$$

$$\text{strength} \mathrel{+}= \text{abs}(mch-nch) + \text{abs}(nch-och) + \text{abs}(och-pch)$$

Figure 3A:
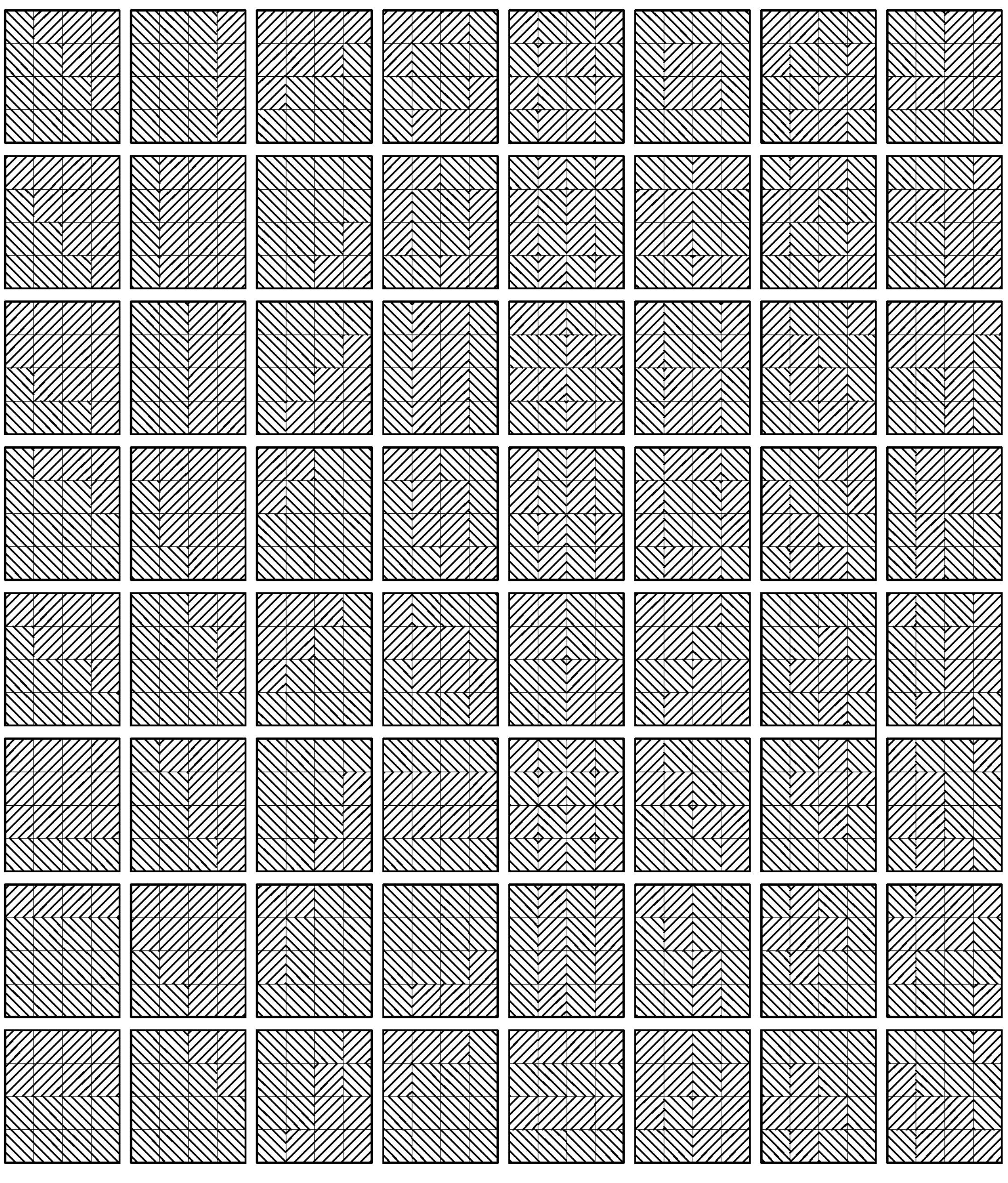
FIG. 3A illustrates sixty four (64) possible partitions for a four-by-four BC7 block divided into two subsets of texels, also referred to herein as "pixels"

Turn now to FIG. 6, which illustrates, for the two-subset case of FIG. 3A, four lists 600, 602, 604, 606 for the respective horizontal, vertical, and two diagonal direction partitions corresponding to the absolute gradient strength being smallest in the respective direction. One of the lists shown in FIG. 6 is selected at state 310 in FIG. 3, namely, the list corresponding to the direction with the smallest absolute gradient strength. The different respective shades of pixels indicate the pixels of each respective subset. As can be seen, the horizontal list 600 includes candidate partitions with one subset being primarily composed of row-aligned pixels, whereas the vertical list 602 includes partitions in which pixels of a subset are primarily vertically aligned, and so on.

Present techniques do not require a fixed set of partitions, only that the partitions in the list should roughly follow their (horizontal, vertical, diagonal) direction as shown in FIG. 6. Example implementations are free to use larger or smaller lists to balance performance and quality. Once the list of partitions has been selected, the gradient strengths are no longer used in the remaining steps.

Figure 7:
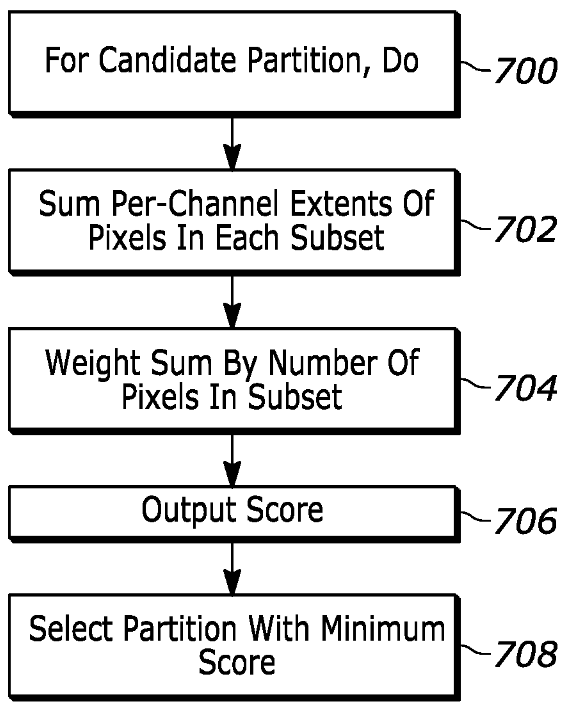
FIG. 7 illustrates example logic in example flow chart format for selecting one of the small group of candidate partitions as the partition to be implemented.
Figure 8:
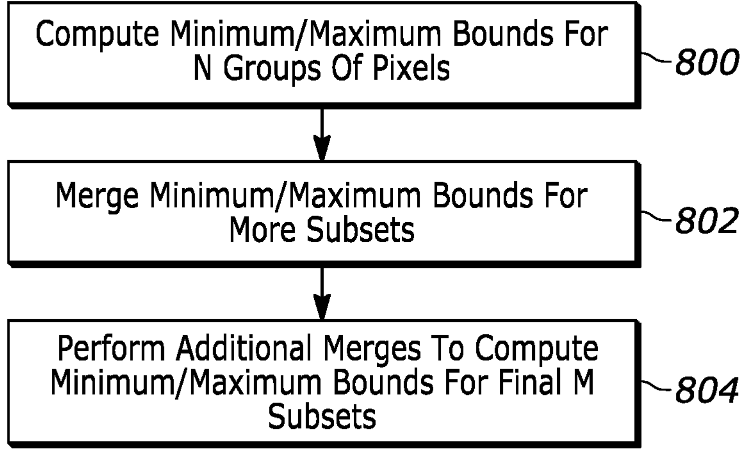
FIG. 8 illustrates example pre-processing logic in example flow chart format for optimizing the logic of FIG. 7.

Which leads to FIGS. 7 and 8. Commencing at state 700, for each candidate partition in the list selected at block 310 of FIG. 3, the logic moves to state 702 to sum the per-channel extents of pixels in each subset of pixels in the candidate partition under test. "Pixel extent" is determined by identifying the minimum and maximum values of a channel from all pixels in a subset, and subtracting the minimum from the maximum. Pixel extent thus is a measure of the range of colors in a block or subset. A block or subset with small extent will be more uniform in color than one with large extent.

The per-channel extents are weighted (e.g., by multiplication) at state 704 by the number of pixels in the subset to produce a score, which is output at state 706. After this is done for all candidate partitions in the list selected at state 310 in FIG. 3, the partition with the minimum score is selected as the partition to implement at state 708.

Below is a naïve implementation that illustrates computing the score for a single partition. FIG. 8, discussed below, provides even more efficiency over the naïve implementation that follows. In the code below, "min" and "max" refer to minimum and maximum selection functions, respectively, whereas "mn" and "mx" refer to minimum and maximum numbers in the set being tested:

```
uint16 calculatePartitionScore(const uint8 subsets[NumSubsets]
[16][NumChannels], uint8 subsetSizes[NumSubsets]) {
    uint16 partitionScore = 0;
    for (uint8 subset = 0; subset < NumSubsets; ++subset) {
        uint8 mn[NumChannels], mx[NumChannels];
        for (uint8 c = 0; c < NumChannels; ++c) mn[c] = mx[c] =
subsets[subset][0][c];
        for (uint8 i = 1; i < subsetSizes[subset]; ++i) {
            for (uint8 c = 0; c < NumChannels; ++c) {
                mn[c] = min(mn[c], subsets[subset][i][c]);
                mx[c] = max(mx[c], subsets[subset][i][c]);
            }
        }
        for (uint8 c = 0; c < NumChannels; ++c) partitionScore +=
subsetSizes[subset] * (mx[subset][c] − mn[subset][c]);
    }
    return partitionScore;
}
```

Where:

subsets [i] [16] [NumChannels] contains the pixels for subset i (not all elements in the array are set);

subsetSizes [i] contains the number of valid pixels in the subsets array;

The partition with minimum partitionScore is selected at state 708 in FIG. 7.

FIG. 8 illustrates how to significantly reduce the number of operations performed compared to the naïve implementation above by noticing that there is significant redundancy in the partition patterns. Taking the horizontal partitions of FIG. 9 for example, one subset includes pixels that occupy the entire top row of each candidate partition, while that same subset also includes pixels that occupy the entire second row for two of the candidate partitions. The results of the min/max operations computed for the top row of the first partition can be reused when computing the second partition and so on.

Thus, at state 800 of FIG. 8, instead of recomputing the partition score from scratch each time, the min/max bounds for smaller groups of pixels (e.g., "N" pixels, wherein Nis an integer greater than one) are computed and at state 802 merged together. State 804 indicates that additional merges are performed to compute min/max bounds for the final "M" subsets, wherein "M: is an integer.

FIGS. 10-21 illustrate the principles of FIG. 8 further using row direction selection as an example. It is to be understood that FIGS. 10-21 are non-limiting examples of potential groups of pixels and a series of merge operations. The optimal choice of groups of pixels and the order in which those groups are merged depends on the list of choice of predefined candidate partitions.

In FIG. 10, the min/max bounds are computed for the four groups of pixels 1000, 1002, 1004, and 1006, since the pixels in each of these rows are all in the same subset (albeit one subset may make up one row and the other subset may make up another row).

Figures 14, 15, 16, 17, 18:
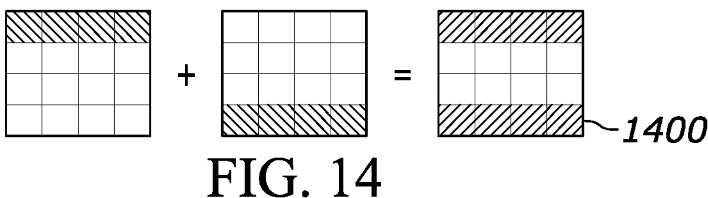

FIGS. 11 and 12 illustrate that the computation of FIG. 10 immediately yields the min/max bounds for two of the subsets 1100, 1200 that are required to be processed in FIG. 7. FIGS. 13-16 illustrate merging the min/max bounds, yielding min/max bounds for four more subsets 1300, 1400, 1500, 1600. FIGS. 17 and 18 then illustrate two more respective merges to compute the min/max bounds for the final two subsets 1700, 1800.

Figure 19:
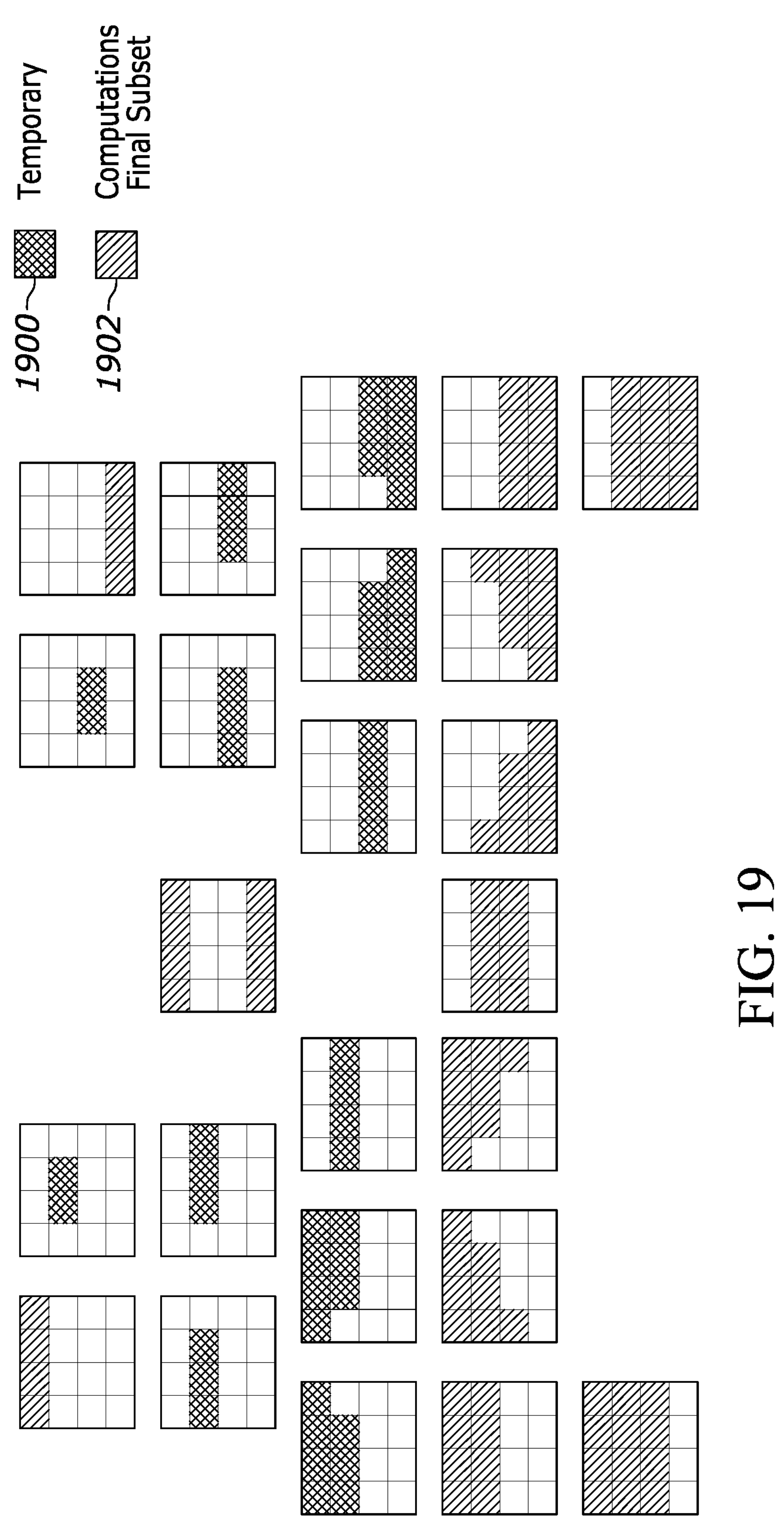

FIG. 19 illustrates a manually designed dependency chain that near-minimizes the number of min/max operations required to compute subsets for the six example horizontal partitions. Each block shows the pixels for which the min and max have been computed. All min/max operations in a row can be performed without a dependency on any other in the same row. Rows above should be computed before rows below. In FIG. 19, pixels with shading 1900 are temporary calculations, whereas pixels with shading 1902 indicate computations of final subsets.

Figure 20:
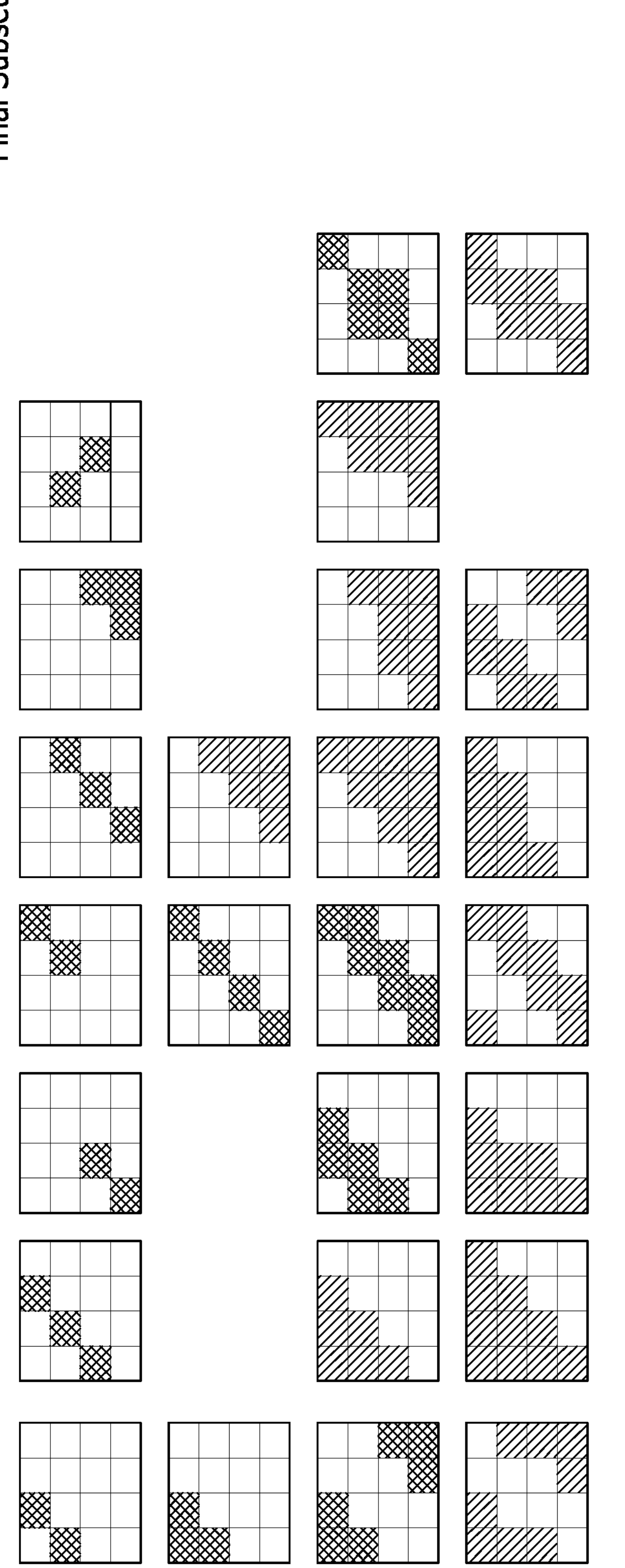

On the other hand, FIG. 20 illustrates a manually designed dependency chain that near-minimizes the number of min/max operations required to compute subsets for the six example forward diagonal partitions discussed previously. As was the case for the horizontal example of FIG. 19, in FIG. 20 each block shows the pixels for which the min and max have been computed, and all min/max operations in a row can be performed without a dependency on any other in the same row. Rows above should be computed before rows below. In FIG. 20, pixels with shading 2000 are temporary calculations, whereas pixels with shading 2002 indicate computations of final subsets.

Figure 3B:
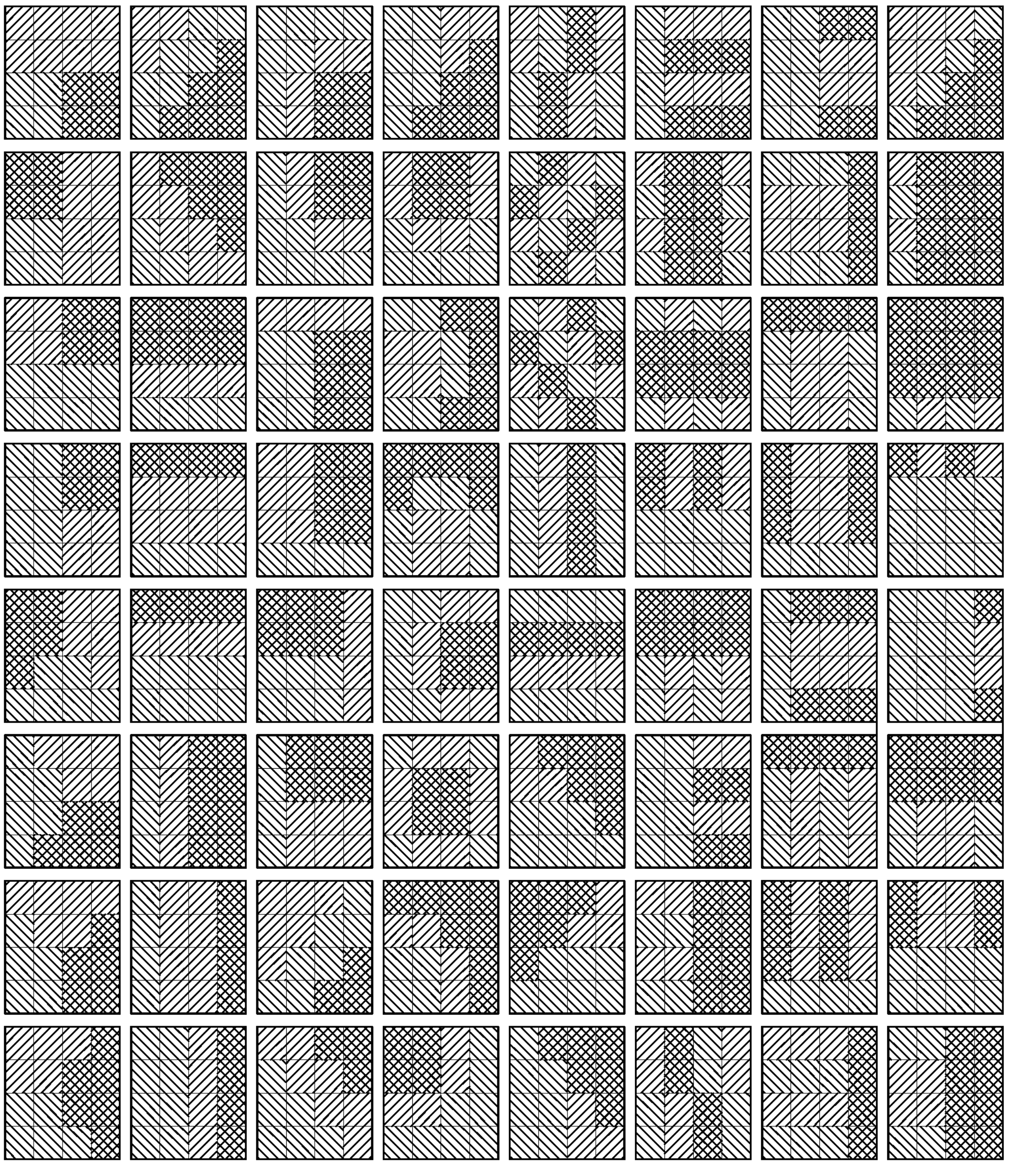
FIG. 3B illustrates sixty four (64) possible partitions for a four-by-four BC7 block divided into two subsets of texels, also referred to herein as "pixels"
Figure 21:
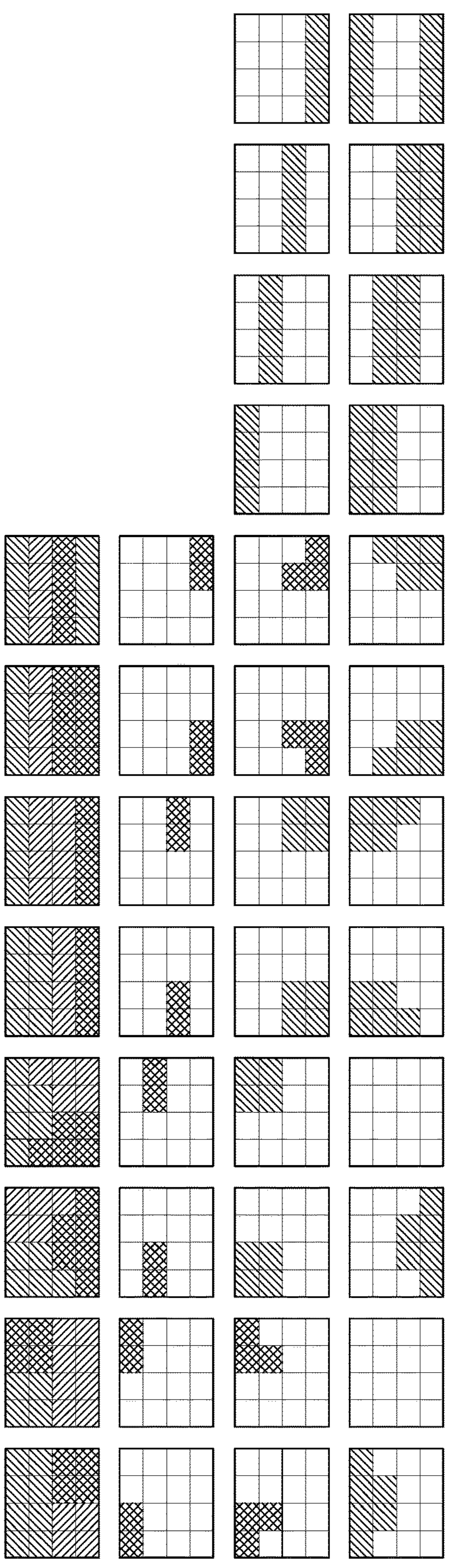
Figure 21:
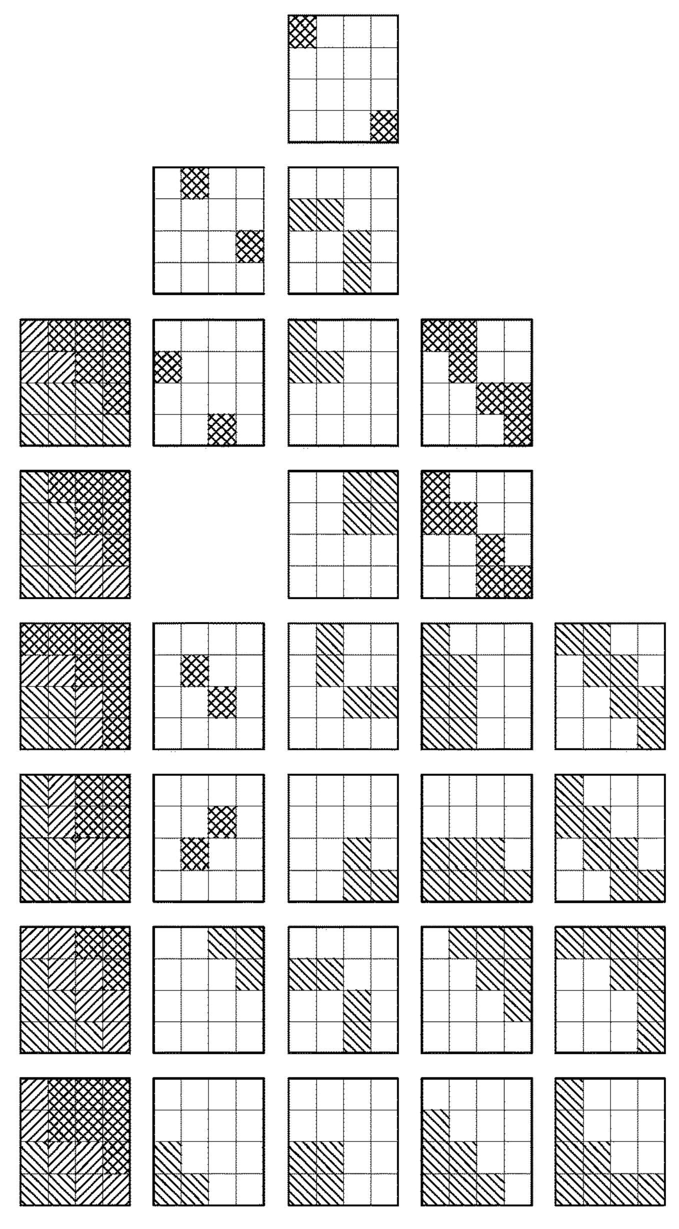
Figure 21:
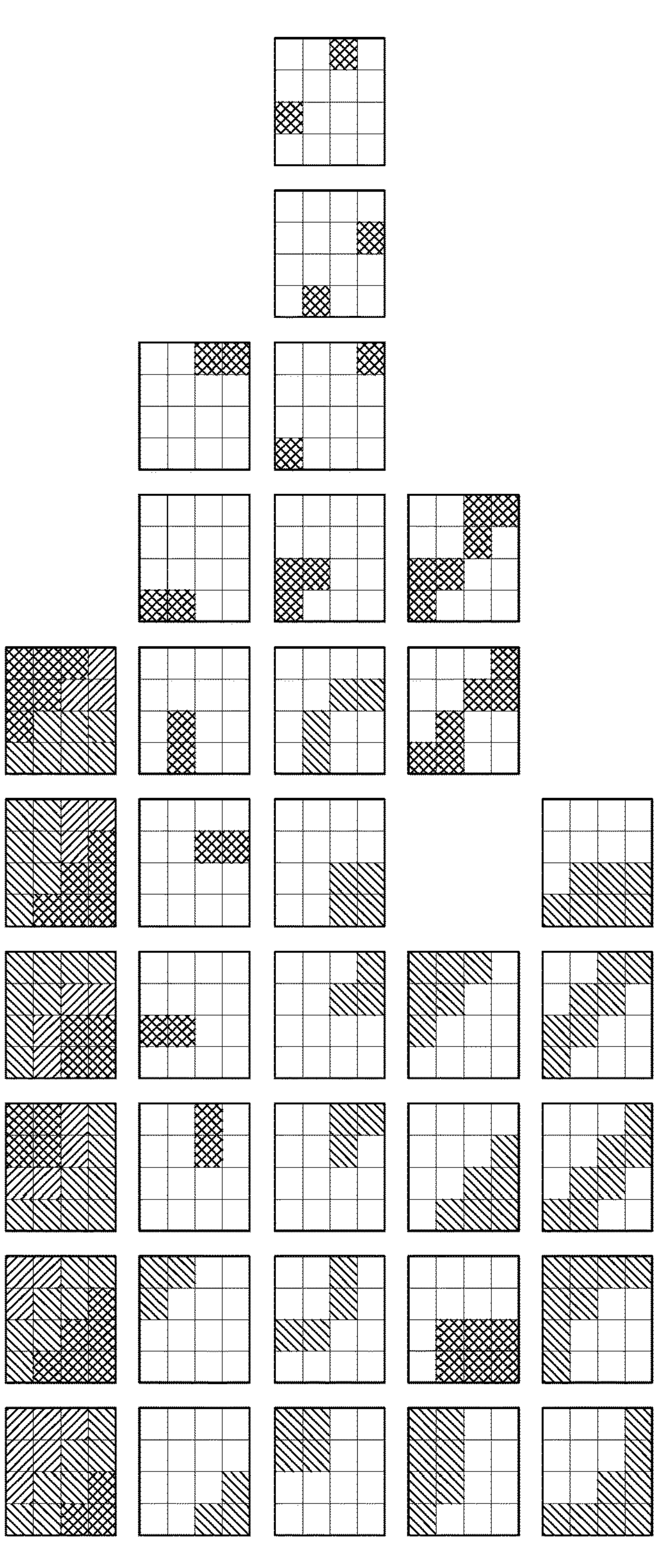
Figure 21:

FIG. 21 illustrates how the principles above extends to 3-subset partitions as shown in the case of FIG. 3B.

Present principles provide not only a technique for efficiently selecting a partition for BC encoding, but also a technique for efficiently selecting a compression mode in the case of BC6 and BC7 that may be used in consonance with the partition selection described above or as a standalone technique.

To amplify on discussion above, BC7 compression, as an example, works by representing the pixels in a 4×4 block (or subset for multi-subset modes) as a pair of endpoint colors and per-pixel interpolation values between the two colors. The endpoint colors are shared by all pixels in the block or subset and as such are moderate-to-high precision, whereas the interpolation values are per-pixel and as such are low-to-moderate precision (a 2, 3, or 4-bit value). Several modes are similar but make different trade-offs between endpoint & interpolation precision:

Modes 0 and 2 have three subsets:

Mode 0:4-bit RGB endpoint colors, 3-bit interpolation values

Mode 2:5-bit RGB endpoint colors, 2-bit interpolation values

Modes 1 and 3 have two subsets:

Mode 1:6-bit RGB endpoint colors, 3-bit interpolation values

Mode 3:7-bit RGB endpoint colors, 2-bit interpolation values

Modes 4 and 5 are a single subset with have two sets of interpolation values (one for RGB and the other for A):

Mode 4:5-bit RGB, 6-bit A endpoint colors, 2 and 3-bit interpolation values

Mode 5:7-bit RGB, 8-bit A endpoint colors, 2 and 3-bit interpolation values

Whether the 3-bit indices in mode 4 are used for RGB or A is signaled by a control bit in the compressed block.

Disclosure below is directed to efficiently selecting which mode to compress a block in without, as is currently done, conducting an exhaustive search in which every mode is tested and the one selected that minimizes compression error. As recognized by present principles, 4×4 blocks of pixels that are near-uniform in color have endpoints that are close together; such blocks will generally benefit more from high-precision endpoints than high-precision interpolation values.

Figure 22:
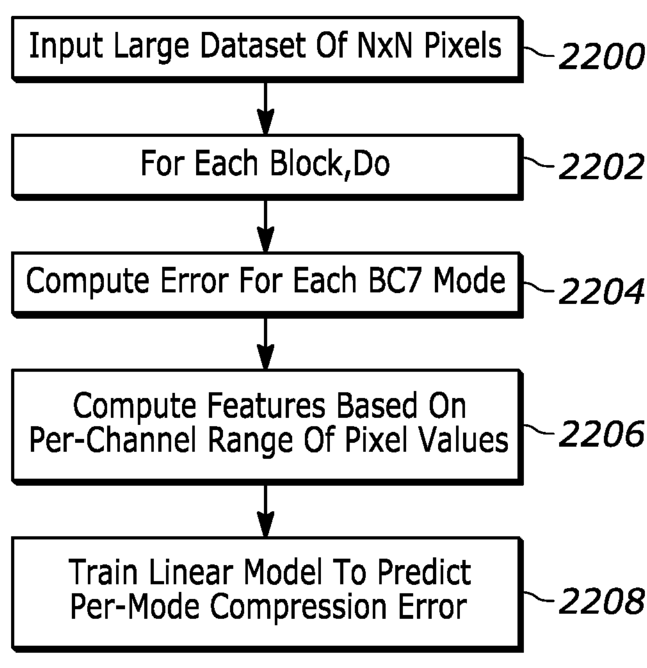
FIG. 22 illustrates example model training logic in example flow chart format for supporting block compression mode selection.

With this recognition in mind, turn now to FIG. 22, which illustrates an offline preprocessing step in which a large dataset of 4×4 blocks of pixels is received at state 2200. Then at state 2202, for each block, the logic moves to state 2204 to compute the error that results from compressing the block in each BC7 mode (mode 4 can be compressed twice, once with 3-bits interpolation values assigned to RGB and once with them assigned to A).

Proceeding to state 2206, for each block a small number of features discussed further below as "rgbRangeMax", "rgbRangeSum", and "aRange" are computed based on the per-channel range of pixel values within the block or subsets (for multi-subset modes) as follows, in which "ch" again refers to channel:

$$rangech = \max ch - \min ch$$

$$rgbRange\text{Max} = \max(rangeR, rangeG, rangeB)$$

$$rgbRangeSum = rangeR + rangeG + rangeB$$

$$aRange = rangeA$$

It is to be noted that the three features above (rgbRangeMax, rgbRangeSum, and aRange) apply to BC7 modes that support alpha. For BC7 modes that do not support alpha, only the first two features are used (and the model need only be trained on these two features). Note further that for multi-subset modes, the relevant features should be computed for each subset separately, then the model evaluated for each subset, and the results of the subsets for a block summed to yield the score.

Moving to state 2208, a linear machine learning (ML) model is trained that predicts the per-mode compression error from these features.

Figure 23:
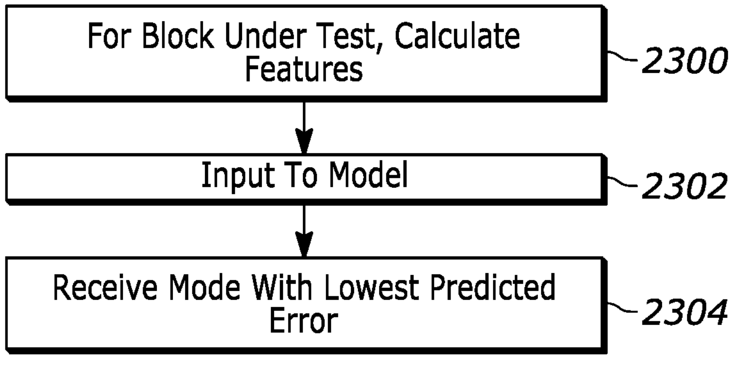
FIG. 23 illustrates example logic in example flow chart format for implementing BC mode selection.

Once the model is trained, it may be used in FIG. 23. At state 2300 the above features are calculated for a block to be compressed and input to state 2302 to the trained model. The model outputs at state 2304 the compression mode predicted to have the lowest error given the features input at state 2302. This mode is used to compress the block.

In an example embodiment the model may output one of three pairs of similar modes, that is, modes (0, 2); modes (1, 3); and modes (4, 5).

Thus, the features used by the model to select the compression mode relate to a channel range that is the difference between the maximum and minimum pixel values for that channel in a block or subset of a block. The maximum of the three RGB channel ranges establishes the first one of the features. The second feature is the sum of the RGB channel ranges, while the third feature is the range of alpha values in the block or subset, in other words, the range of pixel transparency values in the block or subset.

An example linear predictor that chooses between mode 4, 3-bit RGB interpolation/2-bit A interpolation and mode 4, 2-bit RGB interpolation/3-bit A interpolation and mode 5 is given below.

```
uint8 weights[3][3] = {
  { 243, 156, 110 },
  { 103, 242, 193 },
  { 225, 248, 205 },
};
uint32 biases[3] = { 26 << 8, 26 << 8, 5 << 8 };
uint8 rgbRange[3] = { rgbaMax[0] - rgbaMin[0], rgbaMax[1] - rgbaMin[1], rgbaMax[2]
- rgbaMin[2] };
uint8 rgbRangeMax = max(max(rgbRange[0], rgbRange[1]), rgbRange[2]);
uint16 rgbRangeSum = rgbRange[0] + rgbRange[1] + rgbRange[2]);
uint8 aRange = rgbaMax[3] - rgbaMin[3];
uint32 score40 = rgbRangeSum * weights[0][0] + rgbRangeMax * weights[0][1] +
aRange * weights[0][2] + biases[0];
uint32 score41 = rgbRangeSum * weights[1][0] + rgbRangeMax * weights[1][1] +
aRange * weights[1][2] + biases[1];
uint32 score5 = rgbRangeSum * weights[2][0] + rgbRangeMax * weights[2][1] +
aRange * weights[2][2] + biases[2];
uint32 score4 = min(score40, score41);
bool use3BitRgbInterpolation = score4 == score41;
bool useMode4 = score4 < score5;
```

While particular techniques are herein shown and described in detail, it is to be understood that the subject matter which is encompassed by the present application is limited only by the claims.

What is claimed is:

1. An apparatus comprising:

at least one processor assembly configured to:

identify a block of texture data;

for the block, compute, for each color channel of the block, a channel range based at least in part on a difference between a maximum pixel value of the color channel and a minimum pixel value of the color channel within the block;

determine, based at least in part on the channel ranges, a plurality of aggregate channel range measures for the block;

based at least in part on (i) the channel ranges and (ii) the plurality of aggregate channel range measures, identify a block compression 7 (BC7) mode of compression, wherein identifying the BC7 mode of compression comprises, for BC7 modes that partition the block into multiple subsets, computing the channel ranges and the aggregate channel-range measures for each subset separately and identifying the BC7 mode based on a combination of per-subset evaluations; and compress the block of texture data using the BC7 mode of compression.

2. The apparatus of claim 1, wherein the at least one processor assembly is configured to:

input to a machine learning (ML) model at least one channel range; and receive from the ML model identification of the BC7 mode of compression.

3. The apparatus of claim 1, wherein at least one of the respective channel ranges is based at least in part on:

a channel range that is a difference between maximum and minimum pixel values for a channel in a block or subset of a block.

4. The apparatus of claim 3, wherein a maximum one of three RGB channel ranges in a block or subset of a block establishes the at least one of the respective channel ranges.

5. The apparatus of claim 1, wherein at least one of the respective channel ranges is based at least in part on:

a sum of RGB channel ranges in a block or subset of a block.

6. The apparatus of claim 1, wherein at least one of the respective channel ranges is based at least in part on:

a range of alpha values in a block or subset of a block.

7. A device comprising:

at least one computer storage that is not a transitory signal having stored thereon instructions executable with at least one processor assembly to:

select a block compression 7 (BC7) mode of compression for texture data at least in part by:

for each block in a training set of blocks of pixels, computing an error resulting from compressing the block in each of plural BC7 modes;

for each block in the training set, computing a per-channel range as a difference between a maximum pixel value and a minimum pixel value within the block for each color channel, and computing a plurality of aggregate channel range measures;

using the per-channel ranges, the plurality of aggregate channel-range measures, and the errors to train at least one machine learning (ML) model to predict per-mode compression error, wherein training the at least one ML model comprises, for BC7 modes that partition a block into multiple subsets, computing the per-channel ranges and the plurality of aggregate channel-range measures for each subset and using a combination of per-sub set errors associated with the BC7 mode during training; and subsequently use the at least one ML model to select a BC7 mode of compression for the texture data.

8. The device of claim 7, wherein the instructions are executable to:

subsequently use the at least one ML model to select a BC7 mode of compression for the texture data at least in part by:

calculating plural features based on per-channel ranges of pixels in at least a first block of texture data;

inputting the channel ranges to the at least one ML model; and receiving from the at least one ML model a BC7 mode of compression with which to compress the first block using the BC7 mode of compression.

9. The device of claim 8, wherein the channel ranges are based at least in part on:

a channel range that is a difference between maximum and minimum pixel values for a channel in a block or subset of a block.

10. The device of claim 9, wherein a maximum one of three RGB channel ranges in a block or subset of a block establishes the channel ranges.

11. The device of claim 8, wherein the channel ranges are based at least in part on:

a sum of RGB channel ranges in a block or subset of a block.

12. The device of claim 8, wherein the channel ranges are based at least in part on:

a range of alpha values in a block or subset of a block.

13. A method for processing texture blocks, comprising:

computing, for a block of texture data, a channel range for each color channel, the channel range being a difference between maximum and minimum pixel values for a channel in the block;

determining, from the channel ranges, a first feature and a second feature; and using the first and second features to identify, prior to encoding, a block compression 7 (BC7) mode of compression for the block, wherein identifying the BC7 mode of compression further comprises, for BC7 modes that partition the block into multiple subsets, computing the first and second features for each subset and selecting the BC7 mode based at least in part on a combination of per-subset evaluations.

14. The method of claim 13, comprising:

training a machine learning (ML) model to predict which BC7 mode results in a lower predicted error than other BC7 modes for a given input set of features.

15. The method of claim 14, comprising training the ML model at least in part by:

for each block in a training set of blocks of pixels, computing an error resulting in compressing the block in each of plural BC7 modes;

for each block in the training set, computing at least one feature associated with a per-channel range of pixel values within the block;

the features and errors being used by the ML model for training the ML model to predict per-mode compression error based on the features.

16. The method of claim 13, comprising:

using the block compression Z mode of compression to compress the block for storage and/or transmission of the block.

17. The method of claim 16, comprising transmitting the block after compression to a rendering device to render a computer graphics texture on a display.

* * * * *